Patented Sept. 13, 1932

1,876,848

UNITED STATES PATENT OFFICE

RAINALD BRIGHTMAN, OF BLACKLEY, MANCHESTER, ENGLAND, ASSIGNOR TO IMPERIAL CHEMICAL INDUSTRIES LIMITED, OF WESTMINSTER, ENGLAND

MANUFACTURE OF NEW AZO DYES

No Drawing. Application filed April 7, 1930, Serial No. 442,452, and in Great Britain April 11, 1929.

In the specification of application Serial No. 427,961 new trisazo dyes which have the valuable property of dyeing a regenerated cellulose rayon in even shades are obtained by tetrazotizing a 3:4'-diaminoazobenzene or a substitution product thereof. This latter class of compounds may be represented by the probable formula:

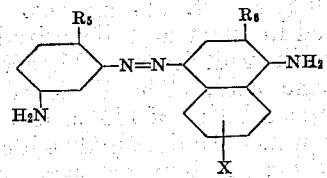

wherein $R_5$ represents hydrogen, an alkyl or alkoxy group, $R_6$ represents hydrogen or an alkoxy group and X represents hydrogen or a sulphonic group, and coupling with suitable components.

According to the present invention, which is an improvement on or modification of the invention claimed in the specification referred to above, I have now found that in place of the 3:4'-diaminoazobenzene or its derivatives there may be used 3-aminobenzene-1'-azo-4'-aminonaphthalene or a nuclear substitution product thereof. The 3-aminobenzene-1'-azo-4'-aminonaphthalene or its derivatives may be obtained for instance, by coupling a diazotized m-nitroamine of the benzene series with α-naphthylamine or a para-coupling nuclear substituted derivative thereof and reducing the nitro aminobenzeneazonaphthalene thus obtained. It is not, however, a necessary part of this invention to isolate the nitro aminobenzeneazonaphthalene. The 3-nitrobenzene-1'-azo-4'-aminonaphthalene may, for example, be diazotized and coupled with a phenol, naphthol or with a sulphonic acid or carboxylic acid derivative thereof, the nitro group in the resultant nitrodisazo dyestuff reduced and the amino disazo dyestuff diazotized and coupled with a coupling component.

The trisazo dyes thus produced may be represented by the following formula:

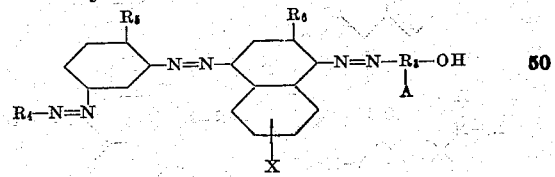

wherein $R_3$ represents a benzene or naphthalene residue, $R_4$ represents the coupled residue of said coupling component, $R_5$ represents hydrogen an alkyl or alkoxy group, $R_6$ represents hydrogen or an alkoxy group and X represents hydrogen or a sulphonic group.

In my process by properly selecting the various diazo compounds and the coupling components I may produce certain subgeneric classes of dyes within the generic class given above, which are advantageous. Some of these subgeneric classes may be represented by the following formulæ:

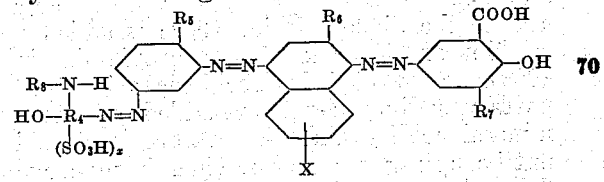

wherein $R_4$ represents a naphthalene residue, $R_7$ represents hydrogen or an alkyl group and $R_8$ represents hydrogen, a benzene residue or an acyl group, and in which $x$ is one or two.

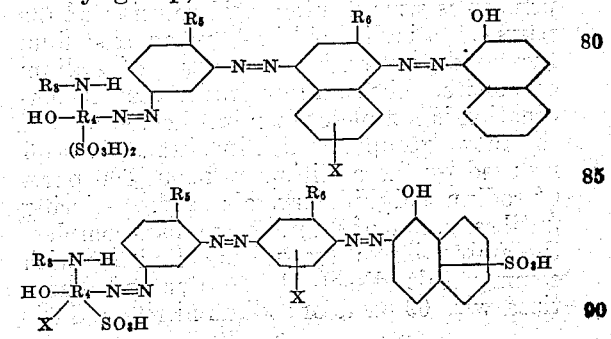

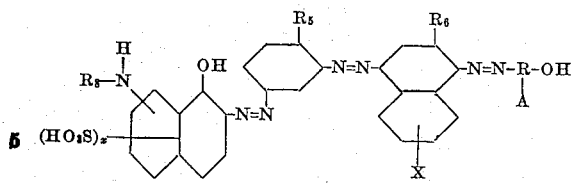

wherein $R_3$ represents a naphthalene or benzene residue and A represents hydrogen, or a COOH or $SO_3H$ group.

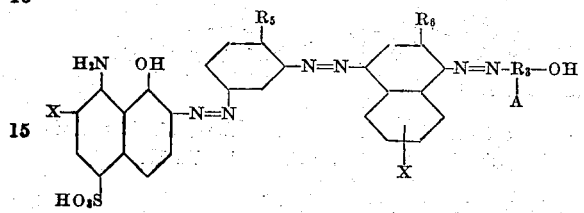

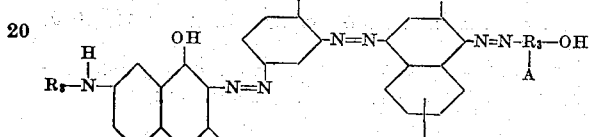

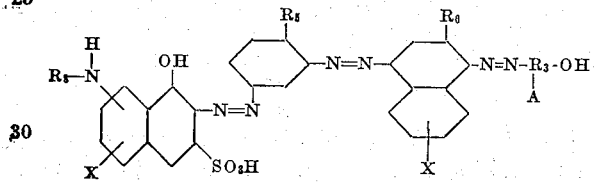

For the production of the best even-dyeing results I have found that it is desirable that at least two carboxylic or sulphonic acid groups or one of each should be present in the trisazo dyestuff molecule.

The invention is illustrated by the following examples, to which however it is not limited. The parts are by weight.

*Example 1.*—138 parts of m-nitroaniline are diazotized with 69 parts of sodium nitrite and 250 parts of 36% hydrochloric acid and to the diazo solution there is added a solution of 143 parts of α-naphthylamine in 100 parts of 36% hydrochloric acid. 280 parts of sodium acetate are added to remove mineral acidity and the mixture is stirred until coupling is complete, when the monoazo dyestuff is filtered off. The aminoazo dyestuff is then stirred into water and diazotized with 300 parts of 36% hydrochloric acid and 69 parts of sodium nitrite. The diazo suspension is stirred into a cold solution of 138 parts of salicylic acid in 40 parts of sodium hydroxide containing 400 parts of sodium carbonate. The coupling is stirred until combination is complete when it is heated up and the nitro group in the nitrodisazo dyestuff reduced by the addition of about 360 parts of sodium sulphide crystals. After stirring until reduction of the nitro groups is complete the amino-disazo dyestuff is salted out with common salt, dissolved in water and diazotized with 69 parts of sodium nitrite and 300 parts of 36% hydrochloric acid. The disazo suspension is stirred into a cold solution of 239 parts of 2-amino-8-naphthol-6-sulphonic acid and 400 parts of sodium carbonate. The mixture is maintained alkaline and after stirring until coupling is complete it is heated up and the dyestuff isolated by the addition of common salt. It dyes viscose rayon a deep brown shade. This trisazo dye, in the form of the free acid, may be represented by the following formula:

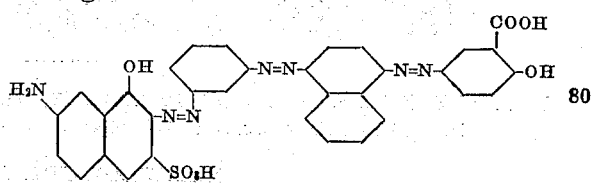

*Example 2.*—152 parts of 4-nitro-2-toluidine are diazotized with 60 parts of sodium nitrite and 250 parts of 36% hydrochloric acid. To the diazo solution there is added a solution of 223 parts of Cleve's acid and about 280 parts of sodium acetate crystals to remove mineral acidity. After stirring until combination is complete, the coupling is made faintly alkaline and the monoazo dyestuff precipitated by the addition of common salt and filtered off. The aminoazo dyestuff is dissolved in water and diazotized with 69 parts of sodium nitrite and 300 parts of 36% hydrochloric acid. The diazo solution is stirred into a solution of 144 parts of β-naphthol in 40 parts of sodium hydroxide containing 400 parts of sodium carbonate, and when combination is complete the mixture is heated up and the nitro group in the nitrodisazo dyestuff reduced with 360 parts of sodium sulphide crystals. After stirring until this reduction is complete the aminodisazo dyestuff is salted out by the addition of common salt, filtered off, dissolved in water and diazotized with 69 parts of sodium nitrite and 300 parts of 36% hydrochloric acid. The diazo suspension is stirred into a well-cooled solution of 319 parts of 1-amino-8-naphthol-2:4-disulphonic acid and 400 parts of sodium carbonate. The mixture is maintained cold and alkaline and after stirring until coupling is complete it is heated up and the dyestuff isolated by the addition of common salt. This trisazo dye in the form of the free acid may be represented by the following formula:

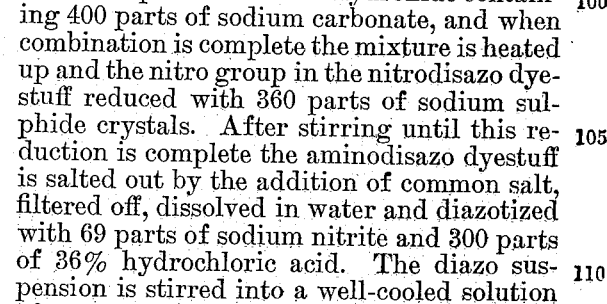

It dyes viscose rayon a blue shade.

Other examples to illustrate the invention are given in the following table.

| | Aminoazo dyestuff from | Diazotized and coupled with | Nitrodisazo dyestuff reduced to amino-disazo dyestuff and coupled with | Shade on viscose rayon |
|---|---|---|---|---|
| 1. | 4-nitro-2-anisidine→Cleve's acid | o-cresotinic acid | 2-benzoylamino-8-naphthol-6-sulphonic acid | Brown. |
| 2. | m-nitroaniline→Cleve's acid | N-W-acid | 2-amino-8-naphthol-6-sulphonic acid | Brownish-violet. |
| 3. | m-nitroaniline→2-ethoxy-Cleve's acid | salicylic acid | 2-phenylamino-8-naphthol-6-sulphonic acid | Blue. |
| 4. | m-nitroaniline→Cleve's acid | 1-naphthol-5-sulphonic acid | phenyl-2-amino-8-naphthol-6-sulphonic acid | Violet black. |
| 5. | 4-nitro-2-anisidine→Cleve's acid | 1-naphthol-4-sulphonic acid | 1-amino-8-naphthol-4-sulphonic acid | Navy blue. |
| 6. | m-nitroaniline→Cleve's acid | salicylic acid | acetyl-2-amino-8-naphthol-6-sulphonic acid | Brown. |
| 7. | m-nitroaniline→α-naphthylamine | salicylic acid | 1-amino-8-naphthol-3:6-disulphonic acid | Violet. |

The trisazo dyes set forth in the above table may be represented by the following formulæ; the formulæ giving the dyestuff in the form of the free acid.

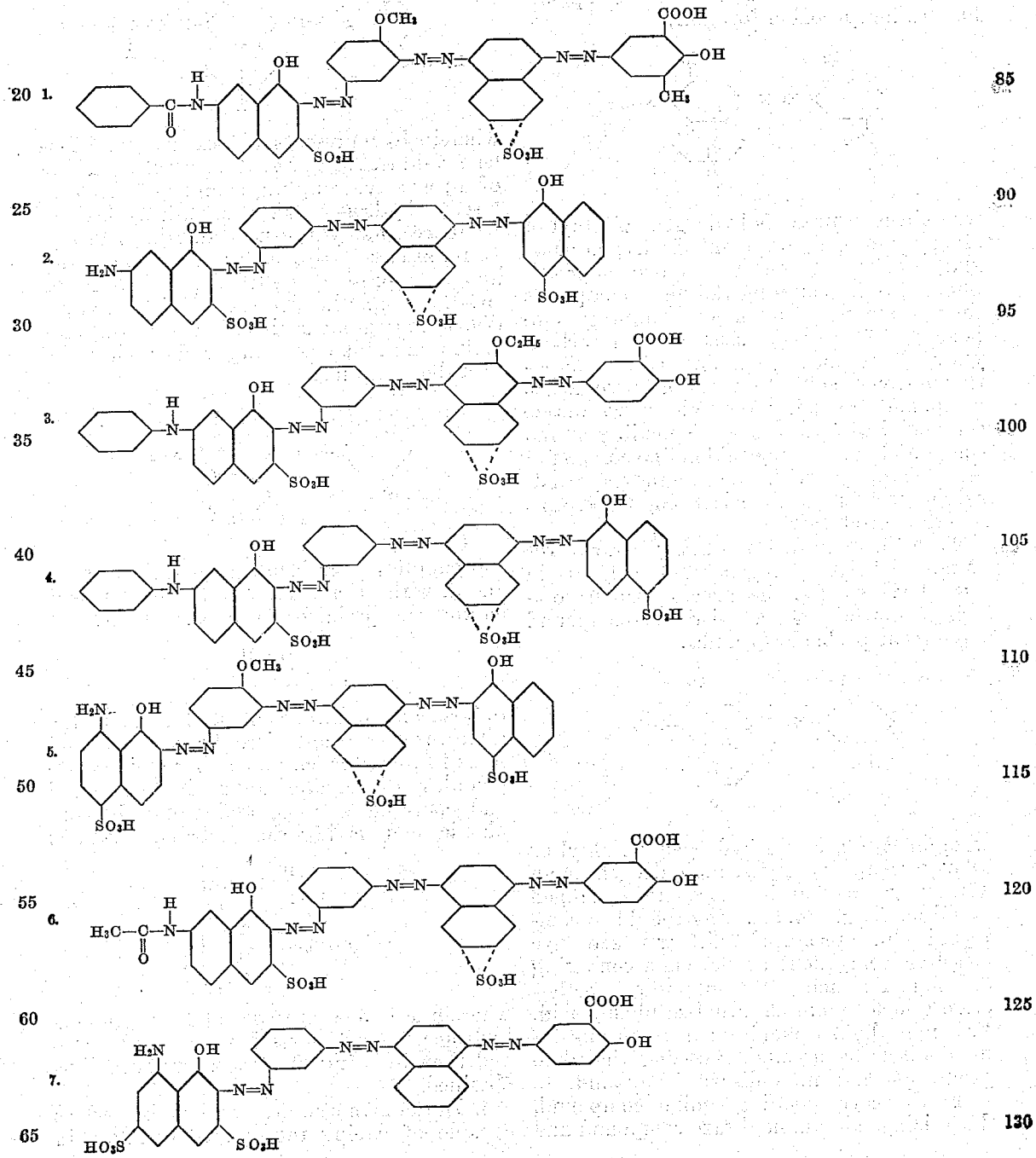

Instead of employing the 3-nitrobenzene-1'-azo-4'-amino-naphthalene as described I may start from 3-aminobenezene-1'-azo-4'-aminonaphthalene, tetrazotizing this and coupling it with two molecular proportions of components in the manner known to chemists to obtain the same dyestuffs as above indicated.

Having now particularly described and ascertained the nature of my said invention and in what manner the same is to be performed, I declare that what I claim is:

1. In the manufacture of new trisazo dyes capable of dyeing regenerated cellulose in even level shades, the process which comprises diazotizing a nitro-azo-compound having the probable formula:

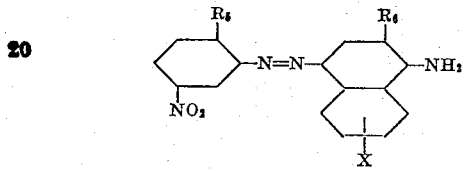

wherein $R_5$ represents hydrogen, an alkyl or alkoxy group, $R_6$ represents hydrogen or an alkoxy group, X represents hydrogen or sulphonic group, coupling the diazo compound thus produced with an azo coupling component of the class consisting of a carboxylic acid of a phenol, a naphthol, and a naphthol-sulfonic acid, to form a nitro-disazo compound, reducing the said nitro disazo compound to form the corresponding amino compound, diazotizing said amino compound and coupling with an amino-naphthol-sulphonic acid and then isolating the trisazo dye thus produced.

2. In the manufacture of new trisazo dyes capable of dyeing regenerated cellulose in even level shades, the process which comprises diazotizing a nitro-azo-compound having the probable formula:

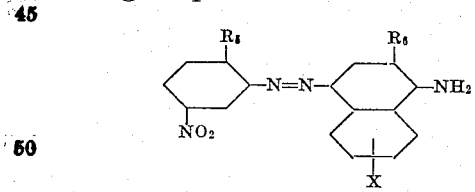

wherein $R_5$ represents hydrogen, an alkyl or alkoxy group, $R_6$ represents hydrogen or an alkoxy group, and X represents hydrogen or sulphonic group, coupling the diazo compound thus produced with an azo dye coupling component of the class consisting of salicylic acid, beta-naphthol, ortho-cresotinic acid, 1:4-naphthol-sulphonic acid, 1:5 naphthol-sulphonic acid, to produce a nitro disazo compound, reducing the nitro group of said nitro-disazo compound, to form the corresponding amino compound, diazotizing said amino disazo compound and coupling with an amino-naphthol-sulphonic acid of the class consisting of 2:8-amino-naphthol-6-sulphonic acid, 2-benzoyl-amino 8-naphthol-6 sulphonic acid, 2-phenyl-8-naphthol-6 suplhonic acid, 2-acetyl-amino-8-naphthol-6-sulphonic acid, 1:8-amino naphthol-2:4-disulphonic acid, 1:8 amino naphthol-3:6-disulphonic acid and 1:8-amino-naphthol-4-sulphonic acid, and then isolating the trisazo dyestuff thus produced.

3. In the manufacture of new trisazo dyes capable of dyeing regenerated cellulose in even level shades and having the probable formula:

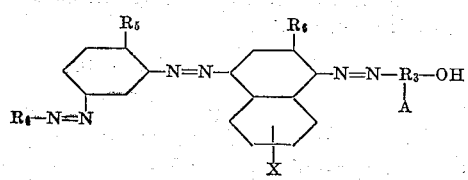

wherein $R_3$ represents a benzene or naphthalene residue, $R_4$ represents a coupled residue of an azo dye coupling component, $R_5$ represents hydrogen, akyl or alkoxy group, $R_6$ represents hydrogen or an alkoxy group, X represents hydrogen or sulphonic group and A represents hydrogen, a COOH or $SO_3H$ group, the process which comprises diazotizing a meta-nitro benzene-1'-azo-4'-amino naphthalene compound having the probable formula:

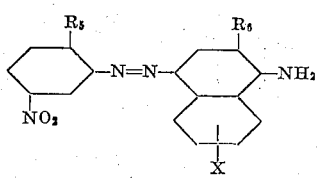

and coupling the diazo compound thus produced, with an azo dye coupling component having the probable formula:

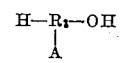

to form a nitro-diazo compound, reducing the nitro group of said nitro-disazo compound so as to form the corresponding amino compound, re-diazotizing said amino compound and coupling with an amino-naphthol-sulphonic acid having the probable formula:

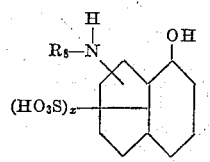

wherein $x$ is one or two and $R_8$ represents hydrogen, a benzene residue or an acyl group and then isolating the trisazo dyestuff thus obtained.

4. In the manufacture of new trisazo dyes capable of dyeing regenerated cellulose in even level shades and having the probable formula:

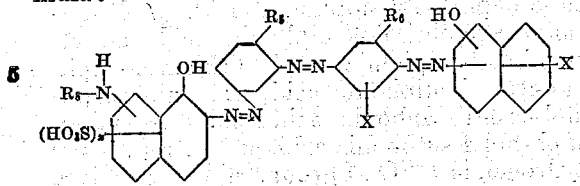

wherein $R_8$ represents hydrogen, a benzene residue or an acyl group, $R_5$ represents hydrogen, alkyl or alkoxy group, $R_6$ represents hydrogen or an alkoxy group, X represents hydrogen or a sulphonic group, $x$ is 1 or 2, and A represents hydrogen a COOH or $SO_3H$ group, the process which comprises diazotizing a nitro benzene-1'-azo-4'-amino naphthalene compound having the probable formula:

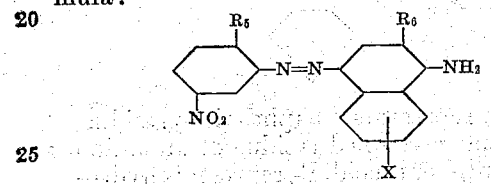

and coupling the diazo compound thus produced with an azo dye coupling component having the probable formula:

to form a nitro-disazo compound, reducing the nitro group of said nitro-disazo compound so as to form the corresponding amino compound, re-diazotizing said amino compound and coupling with an amino naphthol sulphonic acid having the probable formula:

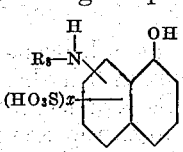

wherein $x$ is 1 or 2 and $R_8$ represents hydrogen, a benzene residue or an acyl group and then isolating the trisazo dyestuff thus obtained.

5. In the manufacture of new trisazo dyes capable of dyeing regenerated cellulose in even level shades and having the probable formula:

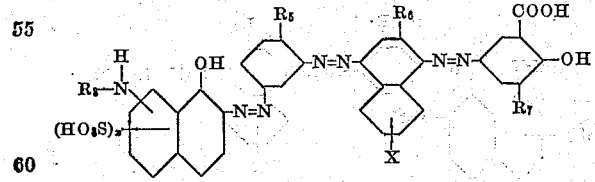

wherein $R_7$ represents hydrogen or an alkyl group, $R_8$ represents hydrogen, a benzene residue or an acyl group, $R_5$ represents hydrogen, an alkyl or alkoxy group, $R_6$ represents hydrogen, or an alkoxy group, X represents hydrogen or sulphonic group, $x$ is 1 or 2, and A represents hydrogen a COOH or $SO_3H$ group, the process which comprises diazotizing a nitro benzene-1'-azo-4'-amino naphthalene compound having a probable formula:

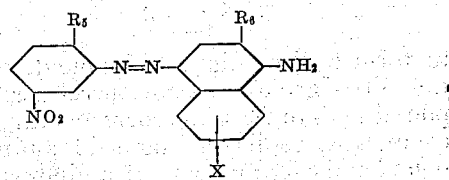

and coupling the diazo compound thus produced, with an azo dye coupling component having the probable formula:

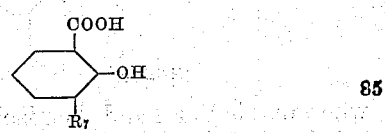

to form a nitro-disazo compound, reducing the nitro group of said nitro-disazo compound so as to form the corresponding amino compound, re-diazotizing said amino compound and coupling with an amino naphthol sulphonic acid having the probable formula:

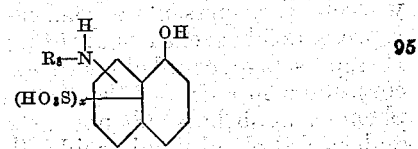

wherein $x$ is 1 or 2 and $R_8$ represents hydrogen, a benzene residue or an acyl group and then isolating the trisazo dyestuff thus obtained.

6. In the manufacture of new trisazo dyes capable of dyeing regenerated cellulose in even level shades and having the probable formula:

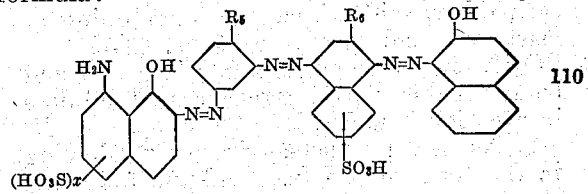

wherein $R_5$ represents hydrogen, alkyl or alkoxy group, $R_6$ represents hydrogen or an alkoxy group, X represents hydrogen or sulfonic group, $x$ is 1 or 2 and A represents hydrogen a COOH or $SO_3H$ group, the process which comprises diazotizing a nitro benzene-1'-azo-4'-amino napthalene compound having the probable formula:

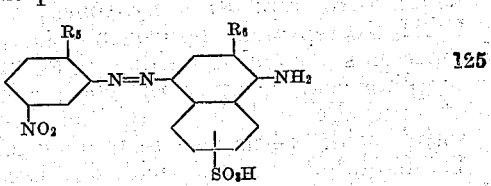

and coupling the diazo compound thus produced with an azo dye coupling component having the probable formula:

to form a nitro disazo compound, reducing the nitro group of said nitro-disazo compound so as to form the corresponding amino compound, re-diazotizing said amino compound and coupling with an amino-naphthol-sulphonic acid having the probable formula:

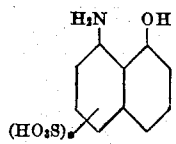

wherein $x$ is 1 or 2 and then isolating the trisazo dyestuff thus obtained.

7. As new products, trisazo dyes having in the form of the free acid the following structural formula:

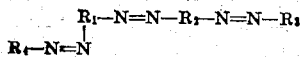

wherein $R_1$ represents a benzene residue, $R_2$ represents a benzene or napththalene residue, $R_3$ represents a coupled residue of an azo dye coupling component of the class consisting of phenols, naphthols, phenol-carboxylic acids and naphthol-sulphonic acids, $R_4$ represents a coupled residue of an amino-naphthol-sulphonic acid of the class consisting of 1:8-amino-naphthol-sulphonic acids, 2:8-amino-naphthol-sulphonic acid and 2-substituted-amino 8-naphthol-sulphonic acids, the azo groups attached to R, being in the meta position to each other and the azo groups attached to $R_2$ being in the para position to each other, said trisazo dyes containing at least two acid groups of type, COOH or $SO_3H$, one of which is a $SO_3H$ group and being capable of dyeing regenerated cellulose in even level shades.

8. As new products, trisazo dyes having in the form of the free acid the following structural formula:

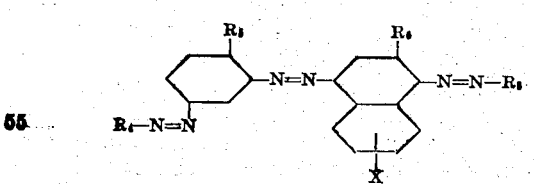

wherein $R_5$ represents hydrogen, $CH_3$ or $OCH_3$, $R_6$ represents hydrogen or $OC_2H_5$, $R_3$ represents a coupled residue of an azo dye coupling component of the class consisting of salicyclic acid, beta-naphthol, orthocresotinic acid, 1:4-naphthol-suphonic acid and 1:5-naphthol-sulphonic acid, $R_4$ represents a coupled residue of an amino naphthol-sulphonic acid of the class consisting of 2:8-amino-naphthol-6-sulphonic acid, 2-benzoylamino-8-naphthol-6-sulphonic acid, 2-phenylamino-8-naphthol-6-sulphonic acid, 2-acetylamino-8-sulphonic acid 1:8-aminonaphthol-2:4 disulphonic acid, 1:8-animonaphthol-3:6-disulphonic acid and 1:8-aminonaphthol-4-sulphonic acid, and X represents hydrogen or a $SO_3H$ group, said trisazo dyes containing at least two acid groups of the type, COOH or $SO_3H$, and being capable of dyeing regenerated cellulose in even level shades.

9. As new products, trisazo dyes having in the form of the free acid the following structural formula:

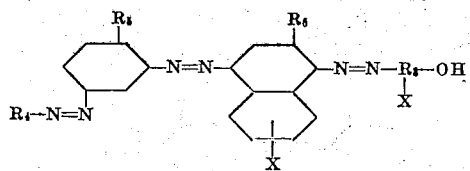

wherein $R_3$ represents a naphthalene residue, $R_4$ represents a coupled residue of an amino naphthol sulphonic acid, $R_5$ represents hydrogen, an alkyl or alkoxy group, $R_6$ represents hydrogen or an alkoxy group, and X represents hydrogen or a $SO_3H$ group, said trisazo dyes being capable of dyeing regenerated cellulose in even level shades.

10. As new products, trisazo dyes having the following structural formula:

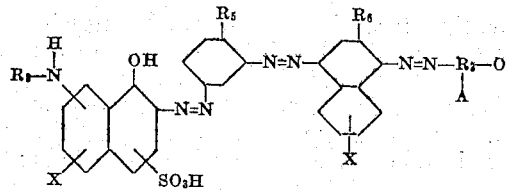

wherein $R_3$ represents a benzene or naphthalene residue, $R_5$ represents hydrogen, an alkyl or alkoxy group, $R_6$ represents hydrogen or an alkoxy group and $R_8$ represents hydrogen, a phenyl, benzoyl or acetyl group, A represents a COOH or $SO_3H$ group, and X represents hydrogen or sulphonic group, said trisazo dyes being capable of dyeing regenerated cellulose in even level shades.

11. As new products, trisazo dyes having in the form of the free acid the following probable structural formula:

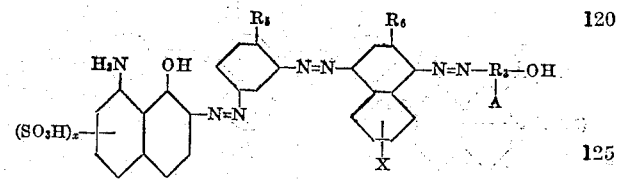

wherein $R_3$ represents a benzene or naphthalene residue, A represents hydrogen, a COOH or $SO_3H$ group, $R_5$ represents H, $CH_3$ or $OCH_3$ group, $R_6$ represents H or $OC_2H_5$ group, A represents H or $SO_3H$, and $x$ is 1 or 2, said trisazo dyes being capable of dyeing regenerated cellulose in even level shades.

12. As new products, trisazo dyes having in the form of the free acid the following probable structural formula:

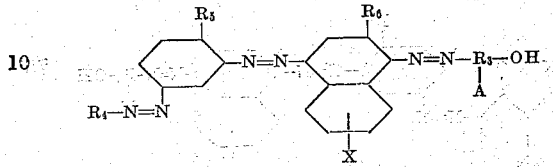

wherein $R_3$ represents a benzene or naphthalene residue, $R_4$ represents a coupled residue of an amino-naphthol sulphonic acid, $R_5$ represents hydrogen, an alkyl or alkoxy group, $R_6$ represents hydrogen or an alkoxy group, A represents hydrogen, a COOH or $SO_3H$ group, and X represents hydrogen or a $SO_3H$ group, said trisazo dyes, being capable of dyeing regenerated cellulose in even level shades.

13. As new products, trisazo dyes having in the form of free acid the following structural formula:

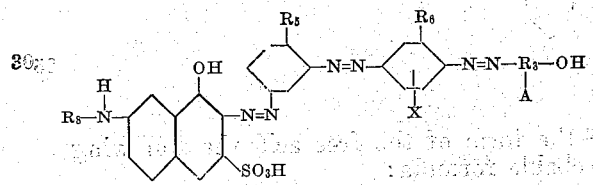

wherein $R_3$ represents a benzene or naphthalene residue, A represents hydrogen, a COOH or $SO_3H$ group, $R_5$ represents hydrogen, an alkyl or alkoxy group, $R_6$ represents hydrogen or an alkoxy group, $R_8$ represents hydrogen, an aryl or acyl group, and X represents hydrogen or $SO_3H$ group, said trisazo dyes being capable of dyeing regenerated cellulose in even level shades.

14. As new products, trisazo dyes having in the form of free acid the following probable structural formula:

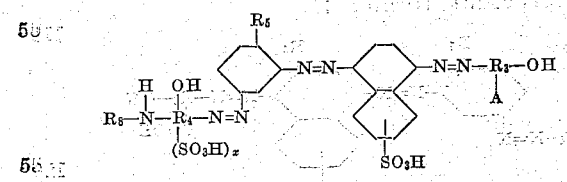

wherein $R_3$ represents a benzene or naphthalene residue, $R_4$ represents a naphthalene residue, $R_5$ represents hydrogen, a $CH_3$, or $OCH_3$ group, $R_8$ represents hydrogen, a phenyl, benzoyl or acetyl group, A represents hydrogen, a COOH or $SO_3H$ group, and $x$ is 1 or 2, said trisazo dyes being capable of dyeing regenerated cellulose in even level shades.

15. As new products, trisazo dyes having in the form of free acid the following probable structural formula:

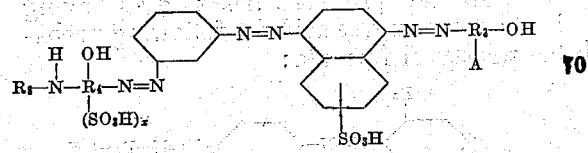

wherein $R_3$ represents a benzene or naphthalene residue, $R_4$ represents a naphthalene residue, $R_8$ represents hydrogen, a phenyl, benzoyl or acetyl group, A represents hydrogen, a COOH or $SO_3H$ group, and $x$ is 1 or 2, said trisazo dyes being capable of dyeing regenerated cellulose in even level shades.

16. As new products, trisazo dyes having in the form of free acid the following probable structural formula:

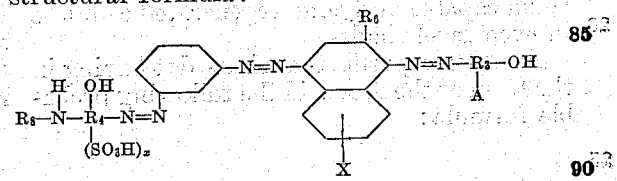

wherein $R_3$ represents a benzene or naphthalene residue, $R_4$ represents a naphthalene residue, $R_6$ represents hydrogen or a $OC_2H_5$ group, $R_8$ represents hydrogen, a phenyl, benzoyl or acetyl group, A represents hydrogen, a COOH or $SO_3H$ group, X represents hydrogen or a $SO_3H$ group, and $x$ is 1 or 2, said trisazo dyes being capable of dyeing regenerated cellulose in even level shades.

17. As new products, trisazo dyes having in the form of free acid the following probable structural formula:

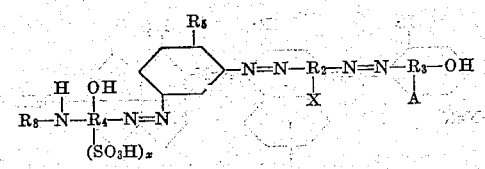

wherein $R_2$ and $R_4$ represents a naphthalene residue, $R_3$ represents a benzene or naphthalene residue, A represents H, COOH or $SO_3H$ group, $R_5$ represents hydrogen, an alkyl or alkoxy group, $R_8$ represents hydrogen, an aryl or acyl group, X represents hydrogen or $SO_3H$ group and $x$ is 1 or 2, said trisazo dyes containing at least two $SO_3H$ or COOH groups and being capable of dyeing regenerated cellulose in even level shades.

18. As new products a trisazo dye having in the form of the free acid the following probable formula:

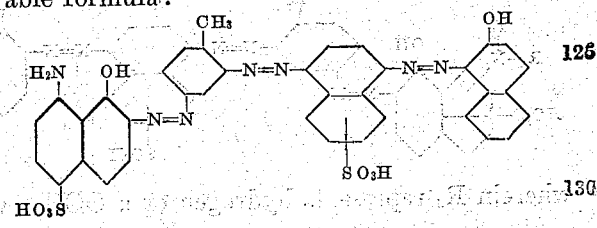

said trisazo dye being capable of dyeing regenerated cellulose in even level blue shades.

19. As new products, trisazo dyes having in the form of free acid the following probable structural formula:

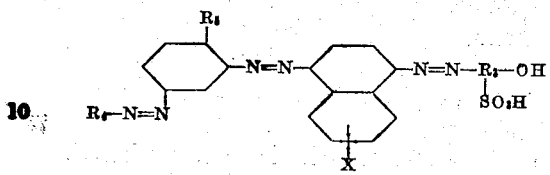

wherein $R_3$ represents a naphthalene residue, $R_4$ represents a coupled residue of an amino-naphthol-sulphonic acid, $R_5$ represents hydrogen, $CH_3$ or $OCH_3$ group, $R_6$ represents hydrogen or $OC_2H_5$ group, and X represents hydrogen or a $SO_3H$ group, said trisazo dyes being capable of dyeing regenerated cellulose in even level shades.

20. As new products a trisazo dye having in the form of the free acid the following probable formula:

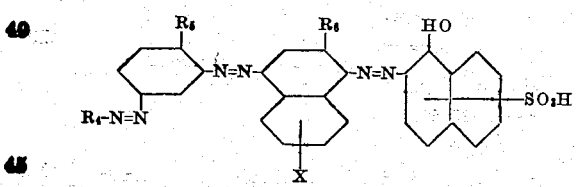

said trisazo dye being capable of dyeing regenerated cellulose in even level violet black shades.

21. As new products, trisazo dyes having in the form of free acid the following structural formula:

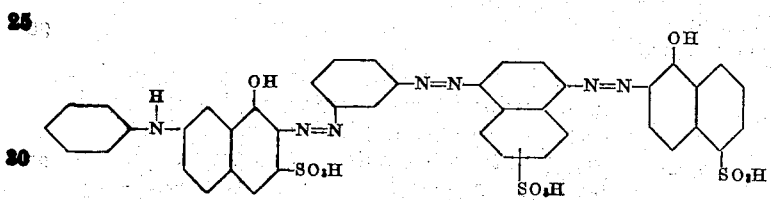

wherein $R_4$ represents a coupled residue of an amino-naphthol-sulphonic acid, $R_5$ represents H, $CH_3$ or $OCH_3$ group, $R_6$ represents H or $OC_2H_5$ group, and X represents H or $SO_3H$ group, said trisazo dyes being capable of dyeing regenerated cellulose in even level shades.

22. As new products, trisazo dyes having in the form of free acid the following structural formula:

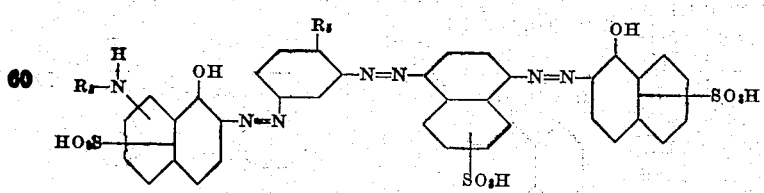

wherein $R_5$ represents hydrogen or a $OCH_3$ group and $R_3$ represents hydrogen or a phenyl group, said two trisazo dyes being capable of dyeing regenerated cellulose in even level shades.

23. As new products, trisazo dyes having in the form of free acid the following structural formula:

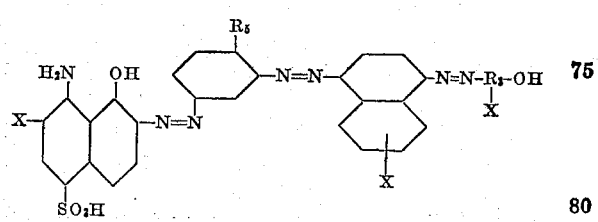

wherein $R_3$ represents a naphthalene residue, $R_5$ represents a $CH_3$ or $OCH_3$ group and X represents hydrogen or sulphonic group, said two trisazo dyes containing at least two $SO_3H$ groups and being capable of dyeing regenerated cellulose in even level shades.

24. As new products a trisazo dye having in the form of the free acid the following probable formula:

said trisazo dye being capable of dyeing regenerated cellulose in even level navy blue shades.

25. As new products, trisazo dyes having in the form of free acid the following probable structural formula:

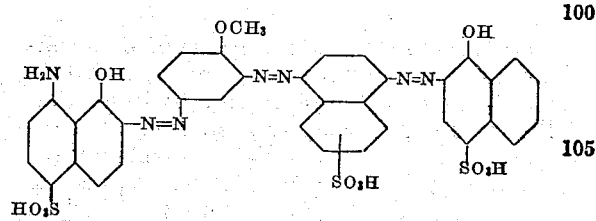

wherein $R_3$ represents a benzene residue, $R_4$ represents a coupled residue of an amino naphthol sulphonic acid, $R_5$ represents hydrogen, an alkyl or alkoxy group, $R_6$ represents hydrogen or an alkyl group, and X represents hydrogen or $SO_3H$ group, said trisazo dyes being capable of dyeing regenerated cellulose in even level shades.

26. As new products, trisazo dyes having in the form of free acid the following probable structural formula:

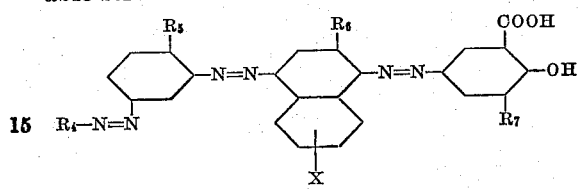

wherein $R_4$ represents a coupled residue of an amino-naphthol-sulphonic acid, $R_5$ represents hydrogen, an alkyl or alkoxy group, $R_6$ represents hydrogen or an alkoxy group, $R_7$ represents hydrogen or alkyl group, and X represents hydrogen or $SO_3H$ group, said trisazo dyes being capable of dyeing regenerated cellulose in even level shades.

27. As new products, trisazo dyes having in the form of free acid the following structural formula:

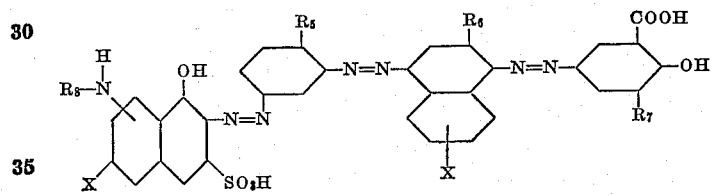

wherein $R_5$ represents hydrogen, an alkyl or alkoxy group, $R_6$ represents hydrogen, or an alkoxy group and $R_8$ represents hydrogen, phenyl, benzoyl or acetyl group, and X represents hydrogen or sulphonic group, said trisazo dyes being capable of dyeing regenerated cellulose in even level shades.

28. As new products a trisazo dye having in the form of the free acid the following probable formula:

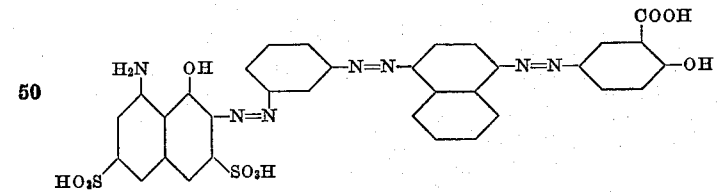

said trisazo dye being capable of dyeing regenerated cellulose in even level violet shades.

29. As new products a trisazo dye having in the form of the free acid the following probable formula:

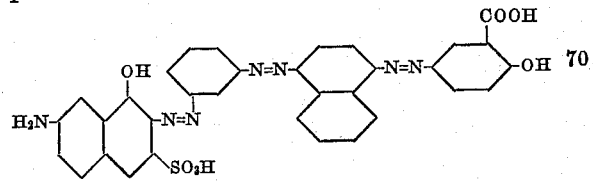

said trisazo dye being capable of dyeing regenerated cellulose in even level deep brown shades.

In testimony whereof I affix my signature.
RAINALD BRIGHTMAN.

Certificate of Correction

Patent No. 1,876,848.  September 13, 1932.

RAINALD BRIGHTMAN

It is hereby certified that error appears in the printed specification of the above-numbered patent requiring correction as follows: Page 1, line 6, beginning with the period and the words "This latter" strike out all through and including the word and comma "group," in line 20; and line 29, after "thereof." insert instead: *This latter class of compounds may be represented by the probable formula:*

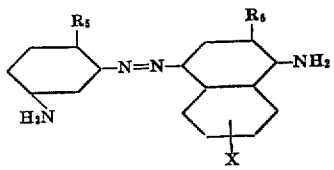

*wherein $R_5$ represents hydrogen, an alkyl or alkoxy group, $R_6$ represents hydrogen or an alkoxy group and X represents hydrogen or a sulphonic group.*; page 2, line 86, for "60" read *69*; page 4, line 90, claim 3, for the misspelled word "akyl" read *alkyl*; page 5, line 70, claim 5, for the article "a" read *the*; and that the said Letters Patent should be read with these corrections therein that the same may conform to the record of the case in the Patent Office.

Signed and sealed this 22d day of November, A. D. 1932.

[SEAL.]

M. J. MOORE,
*Acting Commissioner of Patents.*